UNITED STATES PATENT OFFICE.

JAMES HENDERSON, OF NEW YORK, N. Y.

IMPROVEMENT IN THE MANUFACTURE OF IRON AND STEEL.

Specification forming part of Letters Patent No. 106,365, dated August 16, 1870.

*To all whom it may concern:*

Be it known that I, JAMES HENDERSON, of the State, county, and city of New York, have invented a new and useful Process for Manufacturing Wrought Iron and Steel; and I hereby declare that the following is a full, clear, and exact description thereof.

This invention relates to an improved method of removing carbon, silicon, sulphur, and phosphorus from crude iron; and it consists in the application to liquid crude iron of fluor-spar or fluorides combined with oxides in such a manner as to secure the reactions of the fluorides and oxides simultaneously upon the iron.

I am aware that different fluorides and different oxides have before been used in the production of wrought iron and steel; but they have heretofore been employed separately, and not combined together, as I use them. It is in this that the distinguishing characteristic of my improvement consists, for the reason that when either of them is used separately, instead of being used together, the reactions necessary to effect the object which I have in view are not produced.

Any of the fluorides or oxides which are adapted to use in the manufacture of wrought iron or steel may be employed in my improved process.

One of the modes of application of my said invention, which I have tried with success and which I deem to be the best, is to run molten cast-iron from a melting or smelting furnace into a reverberatory or steel melting or converting furnace, or into any other suitable furnace or receptacle previously charged with fluor-spar, in admixture with oxide of iron, both finely pulverized, and rendered viscid by the heat of the furnace or converter, or made plastic by being mixed with starch or gum-water, or some other equivalent mucilaginous substance, and in that condition applied to the inner surface of the furnace or converter and dried. When the molten metal is poured into the furnace or converter thus prepared, the heat dissolves the fluoride, which combines with the silica contained in the oxide or oxides and in the iron, and, by reason of the affinity of fluor-spar for silica and of oxygen for carbon, oxidizing reactions take place at the same time between the oxygen in the ore and the carbon in the iron. The silica and carbon are removed, while the sulphur and phosphorus also, to a considerable extent, become oxidized. This treatment removes the impurities from the iron in the form of vapor or slag, and leaves the resulting metal in a condition to be hammered or rolled as malleable iron or to be converted into steel.

Another application of my process may be made by mixing granulated cast-iron with pulverized fluor-spar and oxides, and charging them into a furnace or converter. In this case the result will be the same as before described; or cast-iron may be mixed with oxides and granulated, and charged upon the fluor-spar applied as a lining to the furnace or converter; or oxides and fluor-spar may be applied as a lining to the furnace or converter, and pig-iron charged upon them, which when melted will cause the reactions to take place, as before described. Either or all of these methods will produce good results.

It is desirable in all cases to have the fluor-spar and oxides at the bottom of the furnace or converter and to charge the solid or liquid iron upon it, or to have it in admixture with the iron and oxides, in order that the effect of the fluor-spar will be fully exerted upon the crude iron when the reactions occur.

I have found the following proportions of material to be suitable for carrying out my invention—that is to say: Five hundred weight of red hematite or magnetic iron ores, such as those found near Lake Champlain and Lake Superior, and composed of about ninety-four per cent. of peroxide of iron and about six per cent. of silica and alumina, and two hundred weight of fluor-spar to the ton of pig-iron, and when the oxide of iron has a larger percentage of silica and alumina than that above stated it will be well to increase the proportion of fluor-spar one per cent. for each additional per cent. of silica and alumina in the oxide; but the fluorides should in all cases be in sufficient quantity to produce fluoride of silicon when the reactions of the process take place, and in no instance should a less proportion of the fluorides be employed than is equal to about one per cent. of the amount of the crude iron treated.

I do not, however, wish to be understood as limiting my claim of invention to the proportions stated, as I have merely given them as suitable for producing good results, and others may be employed when desired; nor do I wish to be understood as limiting myself to the modes above described for carrying out my process, as the oxides and fluor-spar or fluorides may be applied together in the same manner as, and, if desired, in connection with other fluxes, in any of the processes for preparing crude cast-iron for the production of wrought iron or steel.

Vessels having silicious linings will be injuriously affected by the fluor-spar used in my process, and therefore it will be best to protect the silicious lining with lime or limestone, or magnesia or magnesian lime or limestone, or, if desired, with cast or wrought iron plates placed upon the silicious lining, or upon the lime or limestone, or magnesian lime or limestone; or silicious linings may be entirely dispensed with, and the above-named substances may be substituted for them, and the fluorides and oxides charged upon them.

When pig-iron is employed in which manganese is not present, I prefer that the oxide of manganese, or manganese in some other suitable form, should be used with the other oxides employed in my improvement in sufficient quantity to give hardness to the iron and to confer the welding property upon the steel produced by my process, and also to aid in removing sulphur if the latter is present in the ores or pig-iron treated.

If desired, steel may be produced by my improvement by so diminishing the proportions of the oxides employed as to leave in the resulting metal a sufficient amount of carbon to impart the steely property, or steel may be made by arresting the above-described process before the carbon is removed.

I am aware that it has before been proposed to subject cast-iron, and also cast-iron together with wrought-iron, to the action of fluorides in order to improve the quality of the metal for foundry purposes; but this is entirely unlike my invention, and will not accomplish the result at which I aim.

In my process I subject the crude iron to the combined simultaneous action of the fluorides and oxides in order to produce wrought or malleable iron or steel. I therefore do not claim subjecting cast-iron, either with or without wrought-iron, to the action of fluorides; but,

Having thus described my invention, what I claim, and desire to secure by Letters Patent, is—

The process of treating crude iron by the application to it of a combination of fluorides and oxides, substantially in the manner and for the purposes set forth.

JAMES HENDERSON.

Witnesses:
   T. B. BEECHER,
   E. F. MANSFIELD.